US011924369B2

(12) United States Patent
Matsushima

(10) Patent No.: US 11,924,369 B2
(45) Date of Patent: Mar. 5, 2024

(54) VOICE COMMUNICATION SYSTEM, VOICE COMMUNICATION METHOD, AND VOICE COMMUNICATION PROGRAM

(71) Applicant: ICOM INCORPORATED, Osaka (JP)

(72) Inventor: Hisaaki Matsushima, Osaka (JP)

(73) Assignee: ICOM INCORPORATED, Osaka (JP)

( * ) Notice: Subject to any disclaimer, the term of this patent is extended or adjusted under 35 U.S.C. 154(b) by 289 days.

(21) Appl. No.: 17/629,993

(22) PCT Filed: Aug. 4, 2020

(86) PCT No.: PCT/JP2020/029734
§ 371 (c)(1),
(2) Date: Jan. 25, 2022

(87) PCT Pub. No.: WO2021/100258
PCT Pub. Date: May 27, 2021

(65) Prior Publication Data
US 2022/0256031 A1     Aug. 11, 2022

(30) Foreign Application Priority Data

Nov. 19, 2019    (JP) .............................. 2019-209133

(51) Int. Cl.
*H04W 4/10*          (2009.01)
*H04L 5/14*           (2006.01)
(Continued)

(52) U.S. Cl.
CPC .............. *H04M 3/367* (2013.01); *H04L 5/14* (2013.01); *H04M 3/561* (2013.01)

(58) Field of Classification Search
CPC ............ H04L 65/4061; H04L 65/1069; H04L 65/4038; H04L 65/1016; H04L 65/65;
(Continued)

(56) References Cited

U.S. PATENT DOCUMENTS

| 5,265,262 A | 11/1993 | Grube |
| 5,414,796 A | 5/1995 | Jacobs |

(Continued)

FOREIGN PATENT DOCUMENTS

| EP | 1126437 A2 | 8/2001 |
| JP | H06-509455 A | 10/1994 |

(Continued)

OTHER PUBLICATIONS

ICOM, IP100H IP100FS IP1000C, https://www.icomjapan.com/lineup/products/IP100H/?open=1#detail_content, retrieved on Dec. 14, 2021.
ICOM, IP Radios, https://www.icomjapan.com/lineup/result/?class=1&genre=9, retrieved on Dec. 14, 2021.
The extended European search report for the corresponding EP application No. 20890143.9 dated Sep. 5, 2023.

*Primary Examiner* — Kharye Pope
(74) *Attorney, Agent, or Firm* — Muncy, Geissler, Olds & Lowe, P.C.

(57) ABSTRACT

Provided is a voice communication system that notifies a terminal device of transmission restriction information when the number of received voice signals reaches a predetermined number. A server device continuously counts the number of simultaneously received voice signals. A first terminal device transmits, to the server device, a voice signal with identification information of a second terminal device. The server device transfers, to the second terminal device, the voice signal transmitted from the first terminal device. However, when the number of simultaneous receptions of the voice signals reaches a predetermined restriction value, the server device transfers, to the second terminal device, the received voice signal with transmission restriction information attached thereto. The second terminal device does not transmit a voice signal, even if a user performs a transmission operation, during reception of the voice signal with the attached transmission restriction information.

18 Claims, 13 Drawing Sheets

(51) Int. Cl.
*H04L 65/4061* (2022.01)
*H04M 3/36* (2006.01)
*H04M 3/56* (2006.01)

(58) Field of Classification Search
CPC ... H04L 12/1822; H04L 12/18; H04L 65/403; H04W 4/10; H04W 76/45; H04W 72/30; H04W 80/10; H04W 4/08; H04W 4/06; H04W 76/10; H04W 76/14; H04W 76/18; H04W 8/186; H04W 28/12; H04W 80/00; H04W 88/06; H04W 88/08; H04M 11/064; H04M 11/06
USPC ............... 455/518, 519, 90.2, 416, 517, 78; 379/202.01, 158
See application file for complete search history.

(56) References Cited

U.S. PATENT DOCUMENTS

| | | |
|---|---|---|
| 2004/0001579 A1 | 1/2004 | Feinberg |
| 2008/0045204 A1 | 2/2008 | Takano |
| 2016/0219024 A1 | 7/2016 | Verzun et al. |

FOREIGN PATENT DOCUMENTS

| | | |
|---|---|---|
| JP | 2005-198133 A | 7/2005 |
| JP | 2008-011180 A | 1/2008 |
| JP | 2009-033363 A | 2/2009 |
| JP | 2009-104458 A | 5/2009 |
| WO | 2014/087764 A1 | 6/2014 |

Fig. 2

| DESTINATION IP ADDRESS | PAYLOAD | | |
|---|---|---|---|
| | VOICE SIGNAL | TRANSMISSION CONTROL INFORMATION | |
| TRANSMISSION- SOURCE IP ADDRESS | | CALLING ID | CALLING TYPE |
| | | TRANSMISSION ID | RESTRICTION FLAG |

Fig. 5

TERMINAL TABLE 311

| TERMINAL NUMBER | ACTIVE FLAG | IP ADDRESS | CONNECTION DESTINATION AP |
|---|---|---|---|
| 1 | ○ | 192.168.0.65 | 192.168.0.11 |
| 2 | ○ | 192.168.0.66 | 192.168.0.12 |
| ... | ... | ... | ... |
| 3000 | × | | |

Fig. 6

GROUP TABLE 312

| GROUP ID | BELONGING TERMINALS |
|---|---|
| 0010 | 1, 2, 3, 4, 5 |
| 0011 | 3, 4, 5, 6, 7 |
| ... | ... |

Fig. 7

SESSION TABLE 313

| SESSION NUMBER | CALLING TERMINAL | PARTICIPATING TERMINALS | HOLDING TIME (TS) |
|---|---|---|---|
| 0012 | 9 | 6,7,8,10 | 1500 |
| 0013 | 23 | 1,3,4,5,23 | 1500 |
| 19 | 2 | 2,19 | 1500 |

Fig. 8

TRANSMITTING TERMINAL TABLE  314

| TERMINAL NUMBER | TRANSMISSION CONTINUATION FLAG |
|---|---|
| 1 | ✔ |
| 3 | — |
| 10 | ✔ |
| ... | ... |
| 253 | — |
| ... | ... |
| 2830 | ✔ |

315

| TRANSMITTING TERMINAL NUMBER | 1705 |
|---|---|

316

| RESTRICTION FLAG | ✔ |
|---|---|

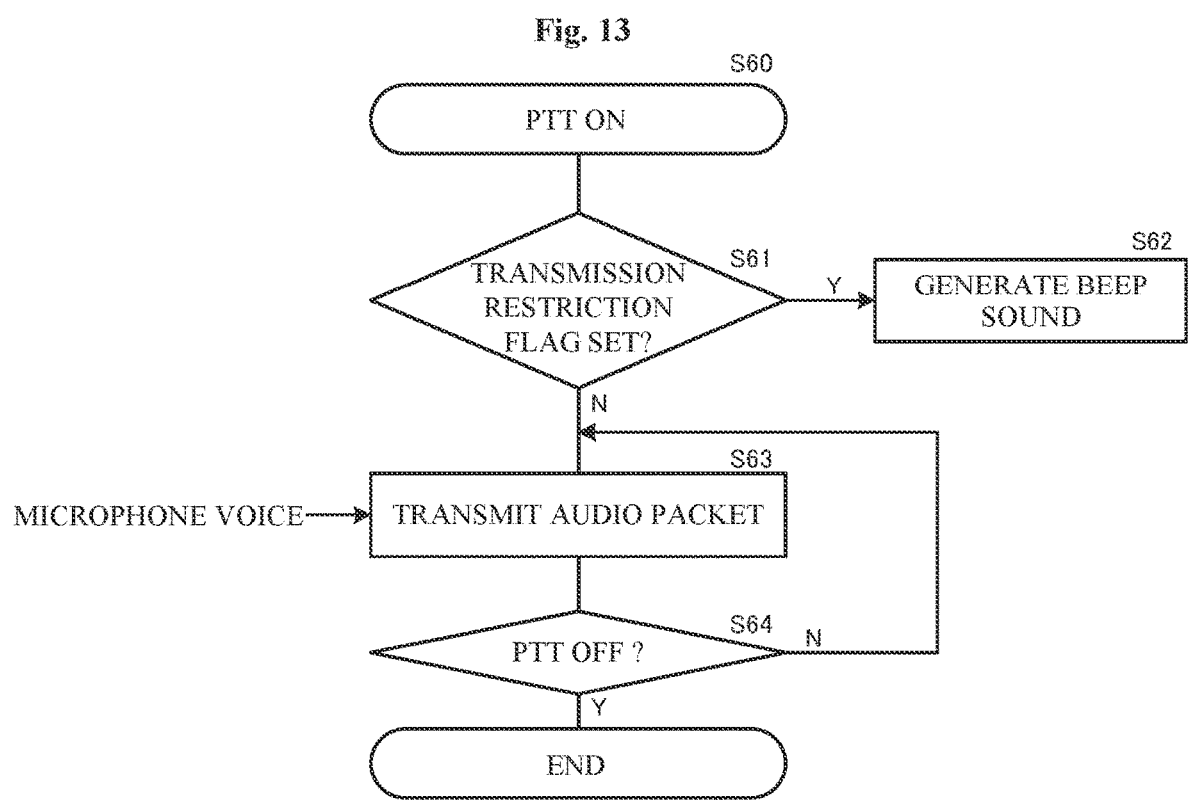

VOICE COMMUNICATION SYSTEM, VOICE COMMUNICATION METHOD, AND VOICE COMMUNICATION PROGRAM

TECHNICAL FIELD

The present disclosure relates to limitation of the number of simultaneous transmissions of voice signals in a voice communication system using a network, such as a wireless LAN.

BACKGROUND ART

A wireless LAN transceiver system has been put into practical use. A voice communication system, such as the wireless LAN transceiver system, includes a plurality of terminal devices (transceivers) connected via a wireless local area network (LAN) and a server device. The server device relays communication between the terminal devices. A terminal device sends a voice signal to the server device. The server device having received the voice signal transfers the voice signal to a terminal device as a communication partner. The voice communication system is capable of performing individual communication and group communication in full duplex by making use of the characteristics of wireless LAN. The terminal devices each have a shape similar to that of a handy transceiver, and can be used with a feeling of use comparable to that of conventional wireless communication.

SUMMARY OF INVENTION

Technical Problem

In the voice communication system described above, the server device relays communication of terminal devices registered in advance. As the size of the voice communication system increases, the number of registered terminal devices increases. If a large number of terminal devices simultaneously transmit voice signals to the server device, the throughput of the server device is sometimes exceeded. If a number of voice signals exceeding the throughput of the server device are sent to the server device, the voice quality of a voice signal transferred to the communication partner is sometimes lowered, or an audio skip sometimes occurs.

An objective of the present disclosure is to provide a voice communication system that notifies a terminal device, in a case where the number of received transmissions of voice signals reaches a predetermined number, that transmission of a voice signal is restricted.

Solution to Problem

A voice communication system according to the present disclosure includes a server device and a plurality of terminal devices, that are connected to each other via a network. The voice communication system performs processing operations described below. A first terminal as a caller transmits, according to a transmission operation by a user, a voice signal and identification information of a second terminal device as a communication partner (responder), to the server device. The server device transfers the voice signal transmitted from the first terminal device to the second terminal device. The server device continuously counts a number of simultaneous receptions of voice signals. The number of simultaneous receptions is, in other words, the number of terminal devices that are transmitting voice signals. In a case where the number of simultaneous receptions reaches a predetermined restriction value, the server device transfers the received voice signal with transmission restriction information attached thereto, to the second terminal device. The second terminal device performs transmission restriction in which the second terminal device does not transmit a voice signal even when a transmission operation is performed by the user, during reception of a voice signal having the transmission restriction information attached thereto.

A voice communication method according to the present disclosure is a method of performing mutual communication between a plurality of terminal devices including a first terminal device as a caller and a second terminal device as a responder, via a server device connected via a network, and includes procedural steps described below. The first terminal device transmits, according to a transmission operation by a user, a voice signal and identification information of the second terminal device, as a communication partner, to the server device. The server device transfers the voice signal transmitted from the first terminal device to the second terminal device. The server device continuously counts a number of simultaneous receptions of voice signals. In a case where the number of simultaneous receptions reaches a predetermined restriction value, the server device transfers the received voice signal with transmission restriction information attached thereto, to the second terminal device. The server device performs transmission restriction in which the second terminal device is inhibited from transmitting a voice signal even when a transmission operation is performed by the user, during reception of a voice signal having the transmission restriction information attached thereto.

A voice communication program according to the present disclosure causes a controller of a server device that communicate with a plurality of terminal devices including a first terminal device as a caller and a second terminal device as a responder, via a network, to function as the following means: first means for receiving a voice signal transmitted from the first terminal device, second means for continuously counting a number of simultaneous receptions of voice signals, and third means for transferring the received voice signal to the second terminal device, the third means transferring, in a case where the number of simultaneous receptions reaches a predetermined restriction value, the received voice signal with transmission restriction information attached thereto, to the second terminal device.

Advantageous Effects of Invention

According to the present disclosure, in a case where the number of transmissions of voice signals from terminal devices reaches a predetermined number, it is possible to restrict transmission of voice signals by transmitting transmission restriction information to the terminal devices.

BRIEF DESCRIPTION OF DRAWINGS

FIG. 2 is a diagram showing the format of a voice packet;

FIG. 5 is a diagram showing a terminal table set in the server device;

FIG. 6 is a diagram showing a group table set in the server device;

FIG. 7 is a diagram showing a session table set in the server device;

FIG. 8 is a diagram showing a transmitting terminal table set in the server device;

FIG. 13 is a flowchart showing operations of the terminal device.

DESCRIPTION OF EMBODIMENTS

Figure 1:
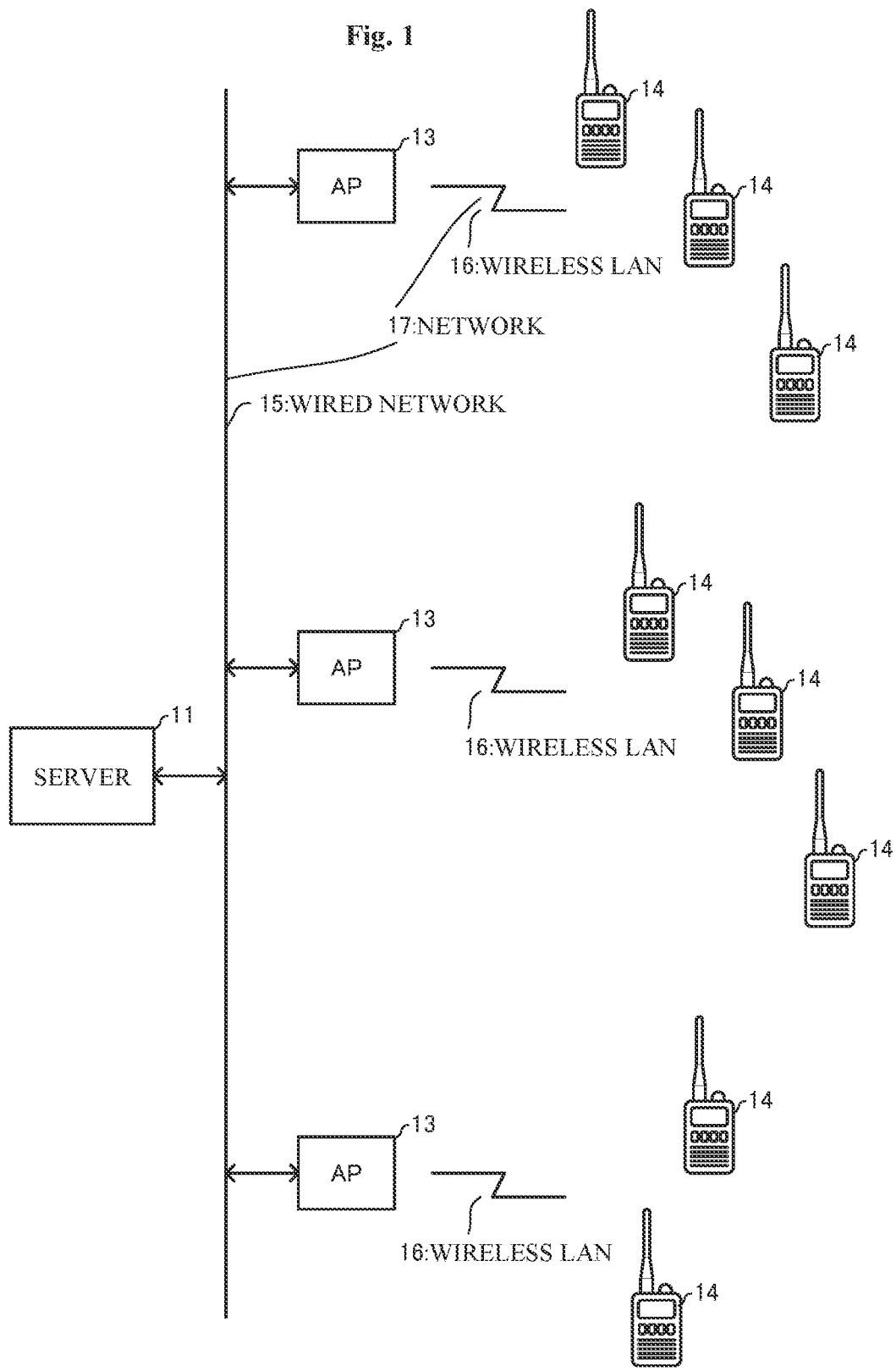
FIG. 1 is a configuration diagram of a voice communication system according to an embodiment of the present disclosure.
Figure 3:
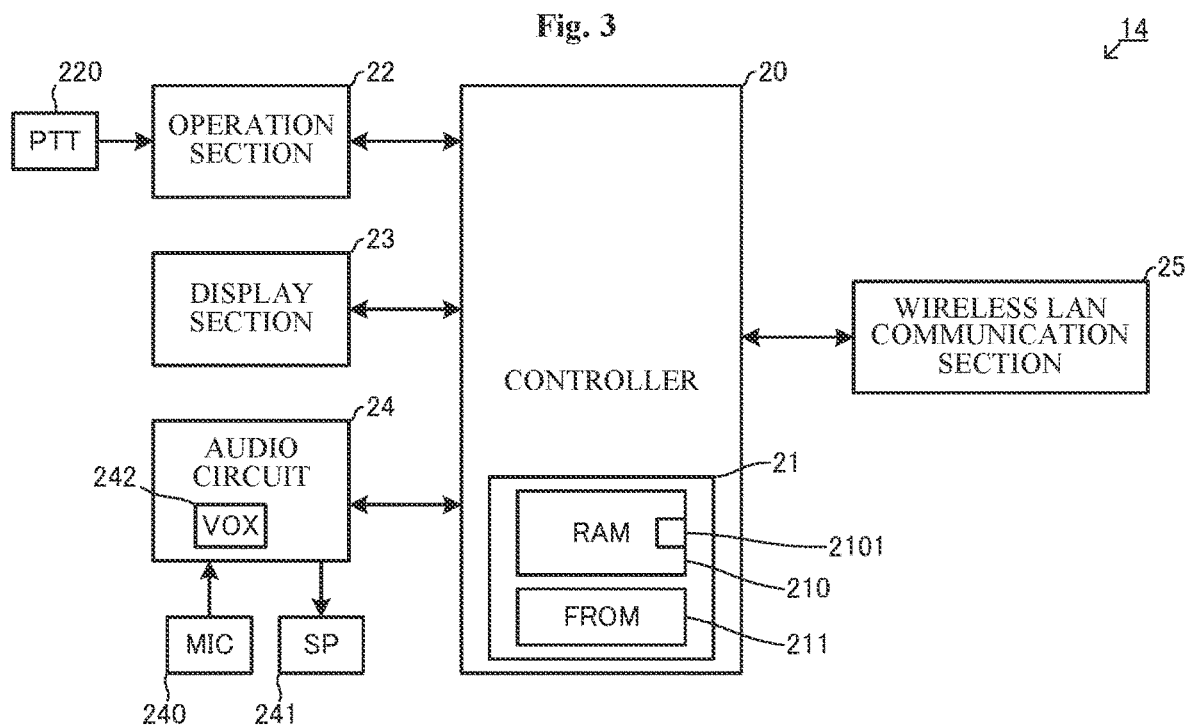
FIG. 3 is a block diagram of a terminal device.

Hereafter, a voice communication system according to the present disclosure will be described with reference to accompanying drawings. FIG. 1 is a configuration diagram of a voice communication system according to an embodiment of the present disclosure. In this voice communication system, a plurality of terminal devices 14 perform mutual communication with each other via a network 17. A server device 11 relays the communication. Each terminal device 14 has a shape similar to a handy transceiver for wireless communication, and includes a push-to-talk (PTT) switch 220 as shown in FIG. 3. When a user talks to a microphone 240 (see FIG. 3) of a terminal device 14 while pushing the PTT switch 220 thereof, the terminal device 14 transmits a voice signal input from the microphone 240 to the server device 11. The server device 11 transfers the voice signal received from the terminal device 14 to a terminal device 14 as a communication partner.

The terminal device 14 is a wireless network device having a function of transmitting and receiving voice packets 100 via a wireless access point (AP) 13. The network 17 is formed by a wired network 15 and wireless local area networks (LANs) 16, such as Wi-Fi (registered trademark) networks. The server device 11 is connected to the wired network 15. Each terminal device 14 performs communication via a wireless LAN 16. The wireless access points 13 connect the wireless LANs 16 to the wired network 15.

As the wired network 15, there can be used an Ethernet (registered trademark) LAN or the Internet. When performing communication via the Internet, it is possible to perform safe communication by using a virtual private network (VPN). Further, as the wireless LAN 16, it is possible to apply a communication method conforming to IEEE802.11, such as Wi-Fi, and the like. The terminal devices 14 and the wireless access points 13 communicate by the communication method of the wireless LAN 16. In FIG. 1, there are disposed three wireless access points 13, but in this voice communication system, there is no limit to the number of wireless access points 13.

In this voice communication system, voice communication is performed by the following procedural steps: When the PTT switch 220 is pushed, the terminal device 14 transmits a voice signal without performing a communication establishing process in advance. The server device 11 receives the voice signal transmitted from the terminal device 14 without executing the communication establishing process in advance. The voice signal transmitted from the terminal device 14 has transmission control information attached thereto. The server device 11 transmits the voice signal to the terminal device 14 as a communication partner, based on the communication control information. By the above-described procedural steps, in this voice communication system, in spite of the voice communication via the network 17, it is unnecessary to perform the communication establishing process, such as an SIP process. This enables the user to perform voice communication via the network 17 similarly to a conventional transceiver for wireless communication, by turning on the PTT switch 220 of the terminal device 14 and talking to the microphone 240.

The terminal device 14 and the server device 11 each packetize a voice signal to transmit and receive the voice signal via the network 17. Since packet transmission is intermittent communication, the terminal device 14 is capable of performing full-duplex communication in which the terminal device 14 performs reception of a voice signal in parallel with transmission of a voice signal. However, the terminal device 14 transmits a voice signal only when the PTT switch 220 is being pressed, in order not to continue transmitting the voice signal all the times. The terminal device 14 continuously receives a voice signal from a terminal device 14 as a communication partner even during transmission of a voice signal caused by pressing of the PTT switch 220, and the voice is output from a speaker 241.

In this voice communication system, three types of communication modes, that is, individual communication, group communication, and entire communication, are performed. The individual communication is a one-to-one communication mode in which one terminal device 14 calls another terminal device 14 and mutual communication is performed between the terminal devices 14. Hereafter, the terminal device 14 that calls a communication partner is referred to as a calling terminal device 14. The group communication is a communication mode in which the calling terminal device 14 calls a group to which a plurality of terminal devices 14 belong and the calling terminal device 14 and the terminal devices 14 that belong to the called group communicate with each other. The entire communication is a group communication in which all the terminal devices 14 are communication targets and the calling terminal device 14 calls all the terminal devices 14 for all the terminal devices 14 to communicate with each other.

The server device 11 registers (accommodates) a plurality of terminal devices 14. The registered terminal devices 14 are capable of performing voice communication via the server device 11. In a case where there are a large number of users, the server device 11 registers a large number (e.g. 3000) terminal devices 14. The number of registered terminal devices 14 sometimes exceeds the simultaneous communication processing capability of the server device 11. For example, let it be assumed that the number of voices which the server device 11 can simultaneously process (maximum number of simultaneous processes) is 2700. Then, in a case where the terminal devices 14 simultaneously transmit voice signals, the server device 11 cannot transfer all the voice signals without interruption, which causes lowered voice quality or audio skip.

To eliminate this inconvenience, in a case where the number of simultaneous receptions of voice signals from the terminal devices 14 reaches a predetermined restriction value (e.g. 2500), the server device 11 restricts the terminal devices 14 from transmitting a larger number of voice signals than this. The transmission restriction is executed by transmitting transmission restriction information to the terminal devices 14. The transmission restriction information is information for notifying each terminal device 14 not to transmit a voice signal. The transmission restriction information is transmitted in a state attached to a voice signal transferred to the terminal device 14 (restriction flag 101).

So long as the transmission restriction information is being transmitted, the terminal device 14 executes transmission restriction and does not transmit a voice signal even when the user operates the PTT switch 220.

FIG. 2 is a diagram showing the format of a voice packet 100. In this embodiment, an RTP packet is used as the voice packet 100. A voice signal is packetized every 20 ms. The RTP packet is formed by a header and a data body (payload). The header is formed by an IP header, a UDP header and a RTP header. FIG. 2 shows the header in a simplified state. The header includes a destination IP address and a transmission source IP address. In the case of a voice packet 100 transmitted from the terminal device 14 to the server device 11, the destination IP address is an IP address of the server device 1 land the transmission source address is an IP address of the terminal device 14. In the case of a voice packet 100 transmitted from the server device 11 to the terminal devices 14, the destination IP address is an IP address of the terminal device 14 and the transmission source address is an IP address of the server device 11.

The data body of the voice packet 100 includes a digitized voice signal and communication control information. The communication control information includes a calling type, a calling ID, a transmission ID, and a restriction flag 101. The calling type is information for identifying for which communication type (individual communication, group communication, or entire communication) of a voice signal the voice packet 100 is used for transmission. The calling ID is information for identifying a communication partner. In the case of individual communication, a terminal number of a terminal device 14 as a communication partner is used for the calling ID, and in the case of group communication, a group number indicative of a group to be called is used for the calling ID. The restriction flag 101 is a flag indicating transmission restriction of the server device 11. The voice packet 100 transmitted when the server device 11 is executing transmission restriction has the restriction flag 101 set therein. That is, the set restriction flag 101 corresponds to the transmission restriction information of the present disclosure.

In a case where the voice packet 100 that the server device 11 received from the terminal device 14 is a voice packet 100 for individual communication, the server device 11 transfers this voice packet 100 to the terminal device 14 as a communication partner after reediting the same as described below.

The server device 11 performs:
once buffering the received audio signal (payload of the voice packet 100);
generating a voice packet 100 having a payload of the buffered voice signal and the communication control information;
writing an IP address of the terminal device 14 as the communication partner, as a destination IP address, in the voice packet 100;
writing an IP address of the server device 11, as a transmission source address, in the voice packet 100;
setting/resetting the restriction flag 101 of the voice packet 100 according to whether the transmission restriction is to be executed or not to be executed at the time; and
transferring the reedited voice packet 100 to the terminal device 14 as the communication partner.

In a case where the voice packet 100 that the server device 11 received from the terminal device 14 is a voice packet 100 for group communication, the server device 11 performs mixing transfer of received voice signals. The mixing transfer is comprised of processes described below.

The server device 11 performs:
buffering voice signals (payloads of voice packets 100) received from terminal devices 14 belonging to the group, for 20 ms;
mixing buffered voice signals to generate a voice signal for transfer to each of the terminal devices 14 belonging to the group, such that mixing is separately performed for each terminal device 14 so as not to produce any echo, by mixing, for a terminal device 14 that has not transmitted a voice signal during 20 ms, all the buffered voice signals, and for a terminal device 14 that has transmitted a voice signal during 20 ms, voice signals other than the voice signal transmitted by the terminal device 14;
generating a voice packet 100 having a payload of the generated voice signal and communication control information, for each terminal device 14 belonging to the group;
writing an IP address of each terminal device 14 as a transmission destination, as a destination IP address, in the voice packet 100;
writing an IP address of the server device 11, as a transmission source address, in the voice packet 100;
setting/resetting the restriction flag 101 of the voice packet 100 according to whether the transmission restriction is to be executed or not to be executed at the time; and transferring, to the terminal devices 14, voice packets 100 generated for the terminal devices 14, respectively.

FIG. 3 is a block diagram of the terminal device 14. As described above, the terminal device 14 is a wireless network device having a function of transmitting and receiving voice packets 100 via a wireless access point (AP) 13. A controller 20 is formed by a microprocessor and controls the operation of the terminal device 14. The controller 20 includes a memory section 21. The memory section 21 includes a RAM 210 and a flash ROM 211. The RAM 210 is used for a work memory during operation of the controller 20. The flash ROM 211 is used for storing information, such as network information, in a non-volatile fashion. In the RAM 210, a transmission restriction flag 2101 is set.

The controller 20 is connected to an operation section 22, a display section 23, an audio circuit 24, and a wireless LAN communication section 25. The operation section 22 includes key switches, such as the PTT switch 220, and receives a user operation to input an operation signal indicative thereof to the controller 20. The display section 23 includes a liquid crystal display. The liquid crystal display displays a terminal number/group number of a communication partner selected by a user operation or a terminal number/group number of a communication partner from which a call has been received.

The audio circuit 24 includes the microphone 240 and the speaker 241. The controller 20 decodes a received voice packet 100 and inputs the decoded voice packet to the audio circuit 24. The audio circuit converts the decoded audio signal to an analog signal for output from the speaker 241. Further, the audio circuit 24 converts a voice signal input from the microphone 240 to a digital signal and inputs the digital signal to the controller 20. The controller 20 forms the digital audio signal into a voice packet and inputs the voice packet to the wireless LAN communication section 25. The wireless LAN communication section 25 includes a circuit that performs wireless communication by a communication method conforming to IEEE802.11. The wireless LAN communication section 25 transmits the packet input from the controller 20 to a wireless access point 13. With the functions described above, when a user utters a voice toward the microphone 240 while pushing the PTT switch 220, a voice signal of the voice is edited into a voice packet 100 and the voice packet 100 is transmitted to the server device 11. Further, the wireless LAN communication section 25 inputs a packet received from the server device 11 via the wireless access point 13 into the controller 20.

The terminal device 14 includes the PTT switch 220 and a VOX circuit 242. The VOX circuit 242 is a circuit that determines, based on an input level of the microphone 240 and a duration thereof, whether or not a conversation voice (voice signal) of a user is input. In a case where it is determined that a conversation signal is input, the VOX circuit 242 switches the terminal device 14 to the same transmitting state as when the PTT switch 220 is turned on. The terminal device 14 performs switching of transmission ON/OFF based on one or both of ON of the PTT switch 220 and the VOX circuit 242. The ON of the PTT switch 220 in the description of the present embodiment includes switching to the transmitting state by the VOX circuit 242.

Figure 4:
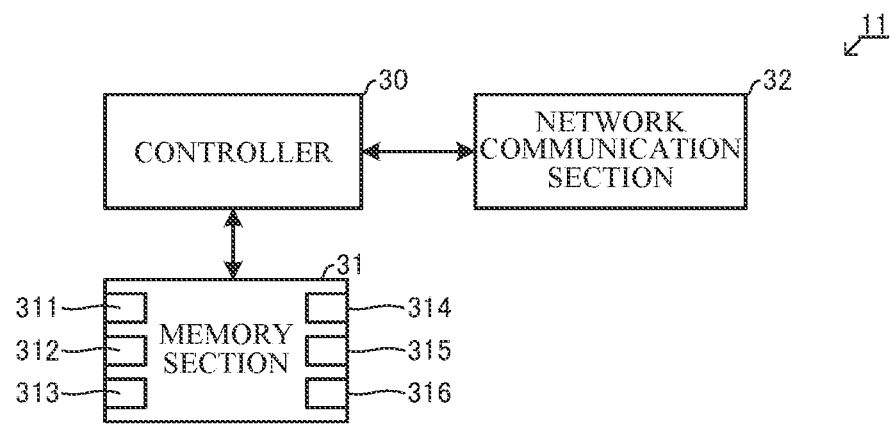
FIG. 4 is a block diagram of a server device.

FIG. 4 is a block diagram of the server device 11. The server device 11 includes a controller 30, a memory section 31, and a network communication section 32. The memory section 31 is formed, for example, by a hard disk and/or a RAM. The network communication section 32 controls communication with the wired network 15. The controller 30 performs mixing and transfer of voice signals transmitted from the terminal devices 14. In the memory section 31, there are set a terminal table 311 shown in FIG. 5, a group table 312 shown in FIG. 6, a session table 313 shown in FIG. 7, a transmitting terminal table 314 shown in FIG. 8, a transmitting terminal number register 315, and a restriction flag 316. A value stored in the transmitting terminal number register 315 corresponds to "the number of simultaneous receptions" of the present disclosure.

FIG. 5 is a diagram showing the terminal table 311 provided in the memory section 31 of the server device 11. The terminal table 311 registers terminal devices 14 used in the voice communication system. The maximum number of terminal devices 14 that can be registered in the terminal table 311 (maximum accommodation number) is 3000. Each terminal device 14 is identified by the terminal number uniquely assigned thereto. The terminal table 311 stores, for each terminal number, an active flag, an IP address, and an IP address of a wireless access point 13 being connected, of the terminal device 14. The active flag is a flag indicating that the terminal device 14 is powered on and is capable of performing communication.

FIG. 6 is a diagram showing the group table 312. The group table 312 registers groups to each of which a plurality of terminal devices 14 belong. Each group is identified by the group number uniquely assigned thereto. The group table 312 stores, for each group, a group number and respective terminal numbers of terminal devices 14 belonging to the group.

FIG. 7 is a diagram showing the session table (mixing table) 313. The session table 313 is a table for the server device 11 to manage communication sessions. A communication session is communication between a plurality of terminal devices 14 that the server device 11 relays. The session table 313 has a plurality of rows and each row stores information of one communication session. The server device 11 refers to the session table 313 when a voice signal (voice packet 100) is received from a terminal device 14, and determines which communication session the voice signal belongs.

When the server device 11 receives a first voice packet 100 (hereafter referred to as "a calling voice packet 100") with which a terminal device 14 calls a terminal device 14 as a communication partner, a communication session based on the calling voice packet 100 is registered in the session table 313.

The session table 313 is provided with a session number, a calling terminal number, participating terminal numbers, and a holding time timer (TS), for each communication session. The session number is a number for identifying the communication session. The calling terminal number is a terminal number of the terminal device 14 that transmitted the calling voice packet 100. The participating terminal numbers are respective terminal numbers of terminal devices that have participated in the communication session. When a voice signal has been transmitted from a terminal device 14 participating in the communication session, the server device 11 transfers the voice signal to the other terminal devices 14 registered in the participating terminal numbers.

The holding time timer TS is a timer that counts non-communication time of a communication session. The non-communication refer to a state in which no voice packet 100 is transmitted from any of the terminal devices 14 participating in the communication session. Even in the state of non-communication, the server device 11 holds the communication session for thirty seconds. The server device 11 deletes a communication session of which the non-communication time has become 30 seconds or more from the session table 313 by a session table management process shown in FIG. 11.

FIG. 8 is a diagram showing the transmitting terminal table 314, the transmitting terminal number register 315, and the restriction flag 316. The transmitting terminal table 314 registers the respective terminal numbers of terminal devices 14 that transmitted voice packets 100 to the server device 11 within the last 20 ms. Further, the transmitting terminal table 314 stores transmission continuation flags associated with the registered terminal numbers, respectively. The management of the number of transmitting terminals by the transmitting terminal table 314 will be described in detail with reference to flowcharts shown in FIGS. 9 and 10.

Figure 9:
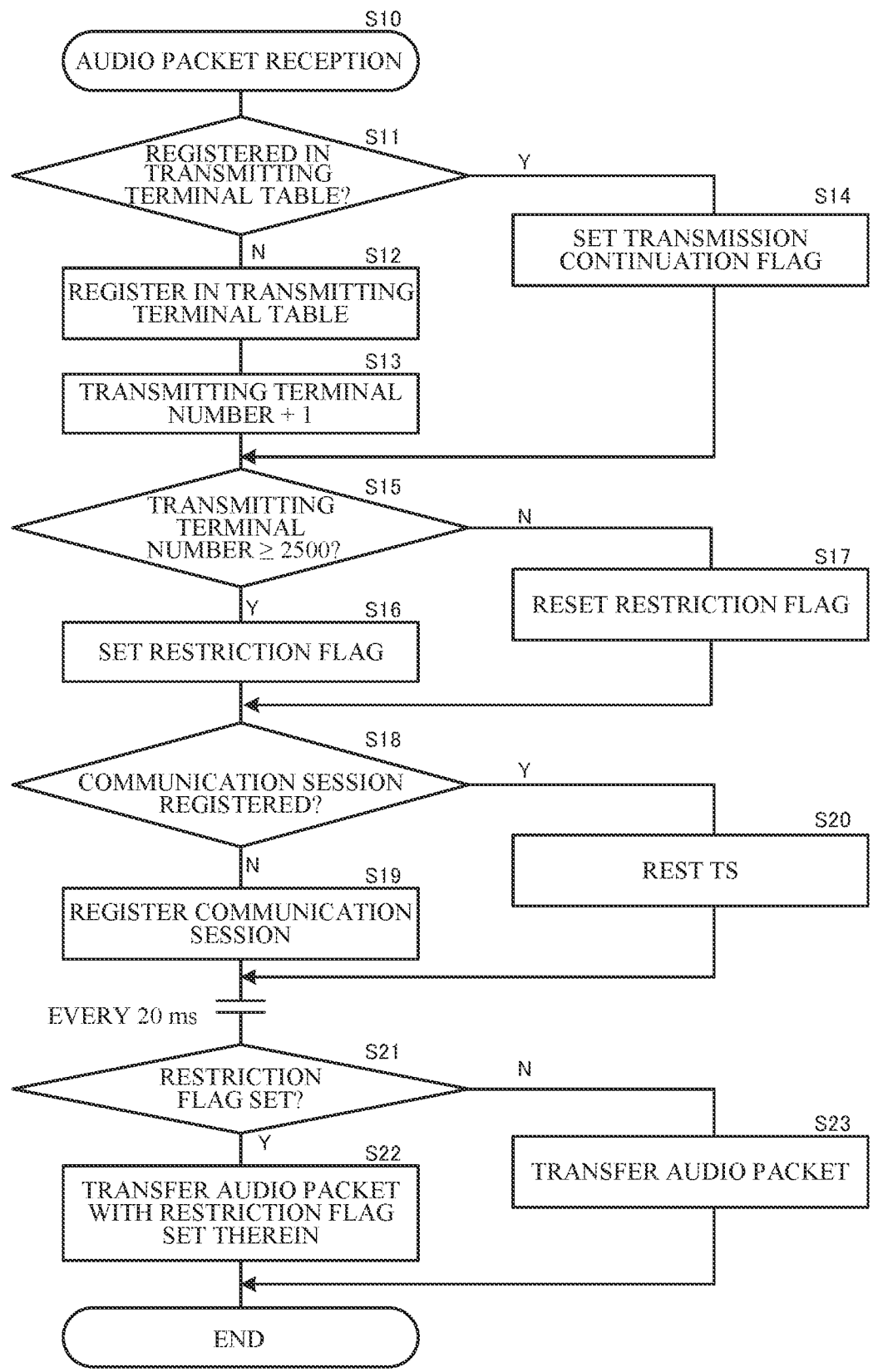
FIG. 9 is a flowchart showing operations of the server device.

FIG. 9 is a flowchart showing processing operations performed when the server device 11 has received a voice signal (voice packet 100) from a terminal device 14. When the server device 11 has received the voice packet 100, the server device 11 performs the processing described below (S10). The server device 11 identifies a terminal number of the terminal device 14 that has transmitted the received voice packet 100, and determines whether the terminal number is registered in the transmitting terminal table 314 (S11). If the terminal number is not registered in the transmitting terminal table 314 (NO in S11), the server device 11 registers the terminal number of the terminal device 14 in the transmitting terminal table 314 (S12), and adds 1 to the transmitting terminal number register 315 (S13). When registering the terminal number, the server device 11 set a transmission continuation flag associated therewith. If the terminal number is already registered in the transmitting terminal table 314 (YES in S11), the server device 11 sets the transmission continuation flag associated with the terminal device 14 (S14).

In S15, the server device 11 refers to the transmitting terminal number register 315, and determines whether the number of transmitting terminals has reached 2500 which is the transmitting terminal number (restriction number) at which transmission restriction is started. If the transmitting terminal number has reached 2500 (YES in S15), the server device 11 sets a restriction flag 316 (S16). If the transmitting terminal number has not reached 2500 which is the restriction value (NO in S15), the server device 11 resets the restriction flag 316 (S17).

In S18, the server device 11 determines whether or not a communication session in which the terminal device 14 as a transmitter of the received voice packet 100 is participating is registered in the session table 313. If the communication session in which the terminal device 14 as a transmitter of the voice packet 100 is participating is not registered in the session table 313 (NO in S18), the server device 11 newly registers in the session table 313, a communication session in which this terminal device 14 and a terminal device 14 as a communication partner, or a group, are set as the participating terminals (S19). If the communication session in which the terminal device 14 as a transmitter of the voice packet 100 is participating is already registered in the session table 313 (YES in S18), the server device 11 resets the holding time timer TS of the communication session to 30 seconds (S20).

Thereafter, the server device 11 transfers the received voice signal. The server device 11 determines whether or not the restriction flag 316 is set (S21). If the restriction flag 316 is set (YES in S21), the server device 11 transfers the voice packet 100 with the restriction flag 101 set therein, to the terminal device 14 as a communication partner (S22). If the restriction flag 316 is not set (NO in S21), the server device 11 transfers voice packet with the restriction flag 101 reset therein, to the terminal device 14 as a communication partner (S23).

In the case of individual communication, the server device 11 transfer the voice signal received in S10 to the terminal device 14 as a communication partner. In the case of group communication, the server device 11 buffers not only the voice signal received in S10, but also voice signals receive from other terminal devices 14 of the group, for 20 ms, and performs mixing transfer of the buffered voice signals.

Figure 10:
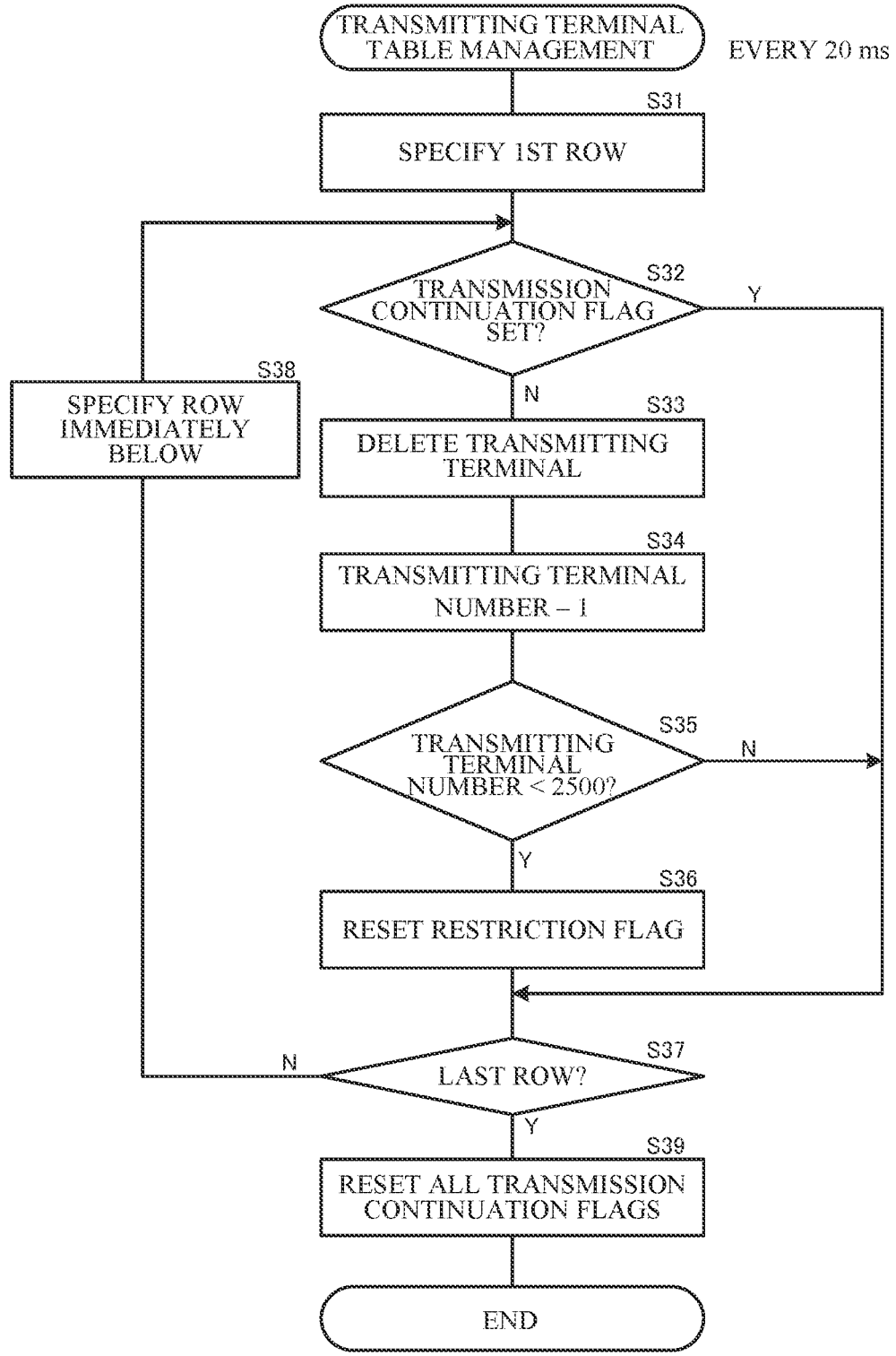
FIG. 10 is a flowchart showing operations of the server device.

FIG. 10 is a flowchart of a management process of the transmitting terminatial table 314. This process is periodically executed every 20 milliseconds in accordance with transmission intervals of voice packets 100. The server device 11 first specifies a first row in the transmitting terminal table 314 (S31). The server device 11 determines whether the transmission continuation flag of the specified row is set (S32). If the transmission continuation flag is reset (NO in S32), the server device 11 deletes the registration in this row by determining that the terminal device 14 described in this row has terminated the transmission of the voice signal (S33). The server device 11 subtracts 1 from the transmitting terminal number register 315 (S34). After the subtraction, the server device 11 determines as to a transmitting terminal number (S35). If the transmitting terminal number is less than 2500 which is the restriction value (YES in S35), the server device 11 resets the restriction flag 316 (S36).

If it is determined in S32 that the transmission continuation flag is set (YES in S32), the server device 11 skips S33 to S36 by determining that the terminal device 14 described in this row is continuing transmission of a voice signal. The server device 11 sequentially executes the above-described processing operations until the last row in the transmitting terminal table 314 is reached (S37, S38). By executing the above-described processing operations until the last row in the transmitting terminal table 314 is reached, terminal devices 14 that have ceased to transmit voice packets 100 are deleted from the transmitting terminal table 314.

The server device 11 resets the transmission continuation flags associated with all the terminal devices 14 registered in the transmitting terminal table 314 (S39), followed by terminating the present process. During the next 20 ms, when a terminal device 14 registered in the transmitting terminal table 314 has transmitted a voice packet 100 to the server device 11, the server device 11 sets a transmission continuation flag associated with the terminal device 14 (see S14 in FIG. 9). By setting this flag, it is recorded that the terminal device 14 is continuing transmission of a voice packet 100. When the transmitting terminal table management process (FIG. 10) is executed again after the 20 ms, the server device 11 holds registration of terminal devices 14 for which the transmission continuation flag is set, by determining that the terminal devices 14 are continuing transmission of voice packets 100, and deletes registration of terminal devices 14 for which the transmission continuation flag is reset, by determining that the terminal devices 14 have terminated transmission of voice packets 100.

Figure 11:
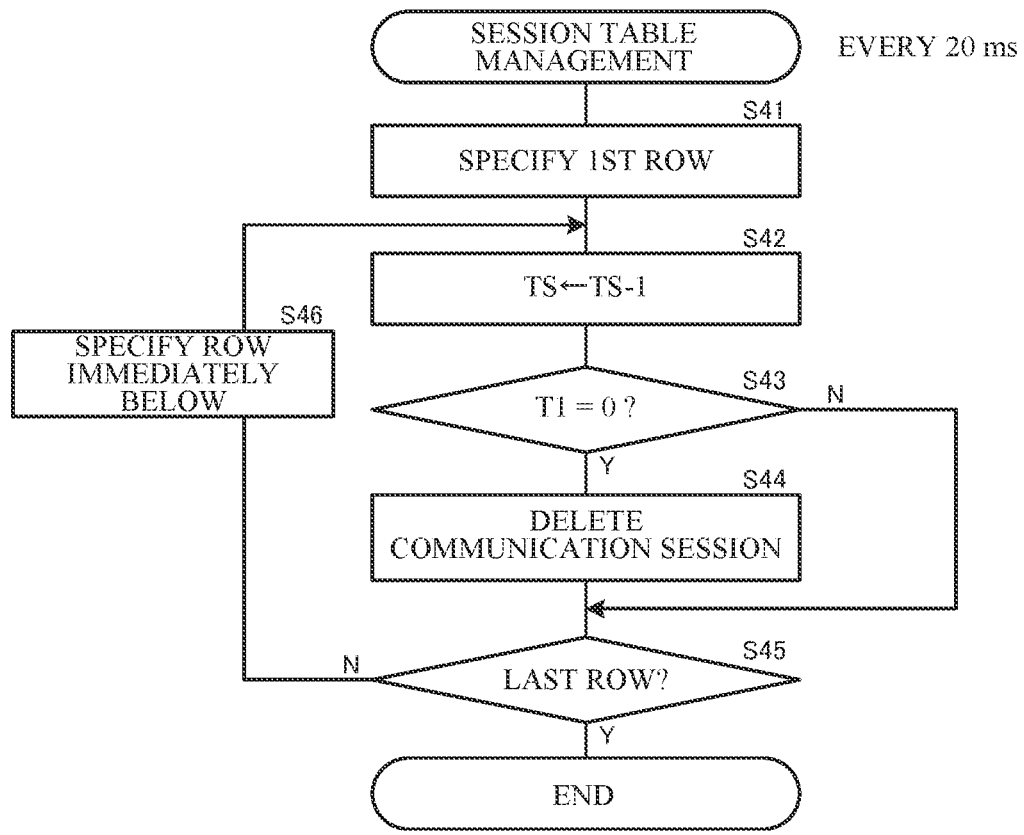
FIG. 11 is a flowchart showing operations of the server device.

FIG. 11 is a flowchart showing a management process of the session table 313. This process is periodically executed every 20 milliseconds in accordance with transmission intervals of voice packets 100. The server device 11 first specifies a communication session in a first row in the session table 313 (S41). The server device 11 subtracts one count (20 milliseconds) from the holding time timer TS of the specified communication session (S42) and determines whether or not the holding time timer TS of the specified communication session is equal to 0 (S43). If the holding time timer TS is equal to 0 (YES in S43), the server device 11 deletes the communication session in this row by determining that this communication session is terminated (S44). By executing the above-described processing operations until the last row in the session table 313 is reached (S45, S46), the server device 11 deletes the terminated communication sessions from the session table 313.

Figure 12:
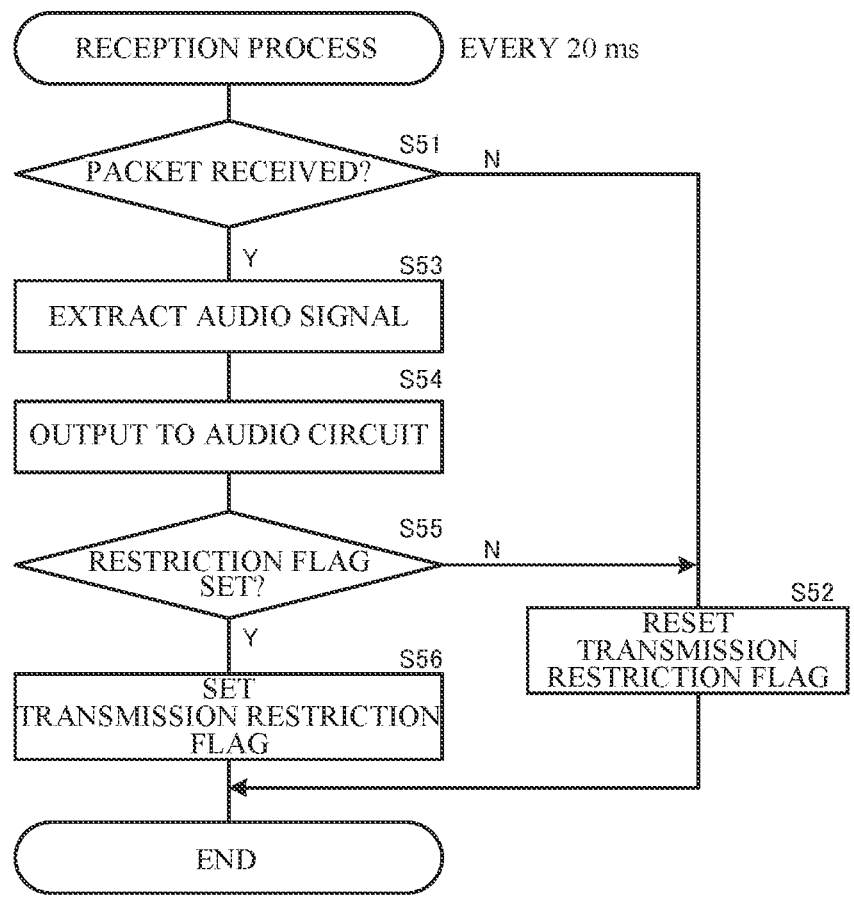
FIG. 12 is a flowchart showing operations of the terminal device.

FIG. 12 is a flowchart showing a reception process of the terminal device 14. This process is periodically executed every 20 milliseconds in accordance with transmission intervals of voice packets 100. The controller 20 of the terminal device 14 first determines whether a voice packet 100 has been received from the server device 11 during the 20 ms (S51). If no voice packet 100 has been received (NO in S51), the controller 20 resets the transmission restriction flag 2101 (S52), followed by terminating the present process. Since the transmission restriction flag 2101 is reset, the terminal device 14 transmits a voice signal when the PTT switch 220 is pressed.

If a voice packet 100 has been received (YES in S51), the controller 20 extracts a voice signal from the received voice packet 100 (S53), and output the voice signal to the audio circuit 24 (S54). The controller 20 determines whether the restriction flag 101 of the received voice packet 100 is set (S55). If the restriction flag 101 is set (YES in S55), the controller 20 sets the transmission restriction flag 2101 (S56). Since the transmission restriction flag 2101 is set, the terminal device 14 does not transmit a voice signal even when the PTT switch 220 is pressed. If the restriction flag 101 of the voice packet 100 is not set (NO in S55), the controller 20 resets the transmission restriction flag 2101 (S52). After processing in S52 or S55, the controller 20 terminates the present process.

FIG. 13 a flowchart showing operations performed when the PTT switch 220 of the terminal device 14 is pressed. When the PTT switch 220 is pressed (S60), the controller 20 determines whether the transmission restriction flag 2101 is set (S61). If the transmission restriction flag 2101 is set (YES in S61), the controller 20 outputs a restriction sound of "beep" from the speaker 241 (S62) but does not perform transmission of a voice signal.

If the transmission restriction flag 2101 is not set (NO in S61), the controller 20 transmits a voice signal input from the microphone 240 to the server device 11 (S63). The voice signal is packetized by the controller 20 for every 20 ms, and the wireless LAN communication section 25 transmits the resulting voice packet 100 to the server device 11. The server device 11 continues transmission of the voice signal until the PTT switch 220 is turned off (S64). Even when the transmission restriction flag 2101 is set by the processing in S56 while the PTT switch 220 is on, the transmission of the voice signal is continued. If the PTT switch 220 is turned off (YES in S64), the controller 20 terminates transmission of the voice signal.

The terminal device 14 performs full duplex communication, and therefore, in the case of group communication (particularly, in the case of group communication in which a large number of users are participating), the terminal device 14 substantially continuously receives a voice signal from the server device 11. For this reason, when the server device 11 starts transmission restriction and transmits a voice packet 100 having the restriction flag 101 set therein to the terminal device 14, the terminal device 14 is placed in a transmission restricted state in which the terminal device 14 is incapable of performing transmission from the own device.

On the other hand, a terminal device 14 that does not participate in group communication and does not perform transmission receives no voice packet 100 from the server device 11, and therefore the transmission restriction flag 2101 of the own device is not set. Therefore, the terminal device 14 that is not performing communication is capable of performing a new call, that is, starting a communication session.

To a terminal device 14 as a communication partner, which was called by this new call, the server device 11 transmits a voice packet 100 in which the restriction flag 101 is set. Therefore, this terminal device 14 cannot immediately respond to this call. However, when the terminal device 14 that called stops transmission of the voice signal, a voice packet 100 ceases to be transmitted to the terminal device 14 as a communication partner, so that the transmission restriction flag 2101 is reset immediately (in 20 ms). This enables the terminal device 14 as a communication partner to respond to the terminal device 14 that called. In other words, a simplex communication session in which transmission from the own device is started after transmission from a communication partner is completed is secured even after the server device 11 has started transmission restriction. The restriction value of communication restriction (2500) is set to a value lower than the maximum number of simultaneous processes (2700) so as to secure this simplex communication. It does not matter that the simplex communication is group communication.

In the present embodiment, the description has been made of a so-called wireless LAN transceiver system in which communication is performed via the network 17 including the wireless LANs 16. The present disclosure can be also applied to a voice communication system using an LTE network. In this case, the column of connection destination AP in the terminal table 311 shown in FIG. 5 becomes unnecessary.

The server device 11 is capable of relaying voice communication, not only by terminal devices 14 connected via the network 17, by also by terminal devices 14 at other sites which are connected via VPN and telephones connected via a RoIP gateway. When relaying communication by these devices, in a case where there are calls from these devices or in a case where voice signals are transmitted therefrom, it is only required that these devices are also counted in the transmitting terminal number.

In the present embodiment, the maximum accommodation number of the server device 11 is 3000, the maximum number of simultaneous processes is 2700, and the restriction value is 2500, but they are not limited to these numerical values. In the present embodiment, when the transmitting terminal number has reached the restriction value, the restriction flag 316 is turned on, but the restriction flag 316 may be turned on when the transmitting terminal number has exceeded the restriction value. In the present embodiment, the size of packetization of a voice signal and the transmission interval of voice packets are set to 20 ms, but they are not limited to 20 ms. Besides these, the values mentioned in the present embodiment can be freely set within the scope of the gist thereof.

Further, the processing procedural steps exemplified in the flowcharts in FIGS. 9 to 13 can be changed in order insofar as it does not cause problem in the process.

For the voice communication system and the voice communication method described in "Solution to Problem", it is possible to perform additions or modifications as described below.

The terminal device performs full duplex communication in which even when the terminal device is transmitting a voice signal to the server device, the terminal device receives a voice signal transmitted from the server device, in parallel.

The server device and the terminal device each divides the voice signal into predetermined time periods (for example, 20 ms) and perform sequential transmission thereof as voice packets. The server device counts the number of simultaneous receptions for each predetermined time period, and when the number of simultaneous receptions reaches a predetermined restriction value, the server device transmits a voice packet with transmission restriction information attached thereto. When the terminal device has received the voice packet having the transmission restriction information attached thereto, the terminal device performs transmission restriction for a predetermined time period.

The terminal device continues transmission of a voice signal until termination of the transmission even when a voice signal having transmission restriction information attached thereto is received from another terminal device during transmission of the voice signal.

In a case where the number of simultaneous receptions by the server device has reached a predetermined restriction value, a first terminal device and a second terminal device (group) may perform alternate communication (simplex communication). The alternate communication is a communication method in which after transmission of a voice signal by the first terminal device is terminated, the second terminal device starts transmission of a voice signal, and after transmission of the voice signal by the second terminal device is terminated, the first terminal device starts transmission of a voice signal.

For the voice communication program described in "Solution to Problem", it is possible to perform addition or modification as described below.

The first means sequentially receives voice packets including voice signals divided into predetermined time periods, and the second means counts the number of simultaneous receptions for each predetermined time period.

REFERENCE SIGNS LIST

11 Server device
13 Wireless access point
14 Terminal device
16 Wireless LAN
17 Network
100 Voice packet
315 Transmitting terminal number register
101, 316 Restriction flag
2101 Transmission restriction flag

The invention claimed is:

1. A voice communication system comprising a server device and a plurality of terminal devices, that are connected to each other via a network, wherein
a first terminal device of the plurality of terminal devices is configured to, as a caller, transmit, according to a transmission operation by a user, a voice signal and identification information of a second terminal device of the plurality of terminal devices, as a responder, to the server device,
the server device is configured to transfer the voice signal transmitted from the first terminal device to the second terminal device,
the server device is configured to continuously count a number of simultaneous receptions of the voice signals, and transfer, in a case where the number of simultaneous receptions reaches a predetermined restriction value, the received voice signal with transmission restriction information attached thereto, to the second terminal device, and
the second terminal device is configured to perform transmission restriction in which the second terminal device does not transmit a voice signal even when a transmission operation is performed by the user, during reception of a voice signal having the transmission restriction information attached thereto.

2. The voice communication system according to claim 1, wherein the terminal device is configured to perform full duplex communication in which even when the terminal device is transmitting a voice signal to the server device, the terminal device receives a voice signal transmitted from the server device, in parallel.

3. The voice communication system according to claim 2, wherein
the server device and the terminal device are each configured to divide the voice signal into predetermined time periods and perform sequential transmission thereof as voice packets,
the server device is configured to count the number of simultaneous receptions for each predetermined time period, and transmit, in a case where the number of simultaneous receptions reaches the predetermined restriction value, the voice packet with transmission restriction information attached thereto, and
the terminal device is configured to perform, in a case where the voice packet having the transmission restriction information attached thereto is received, transmission restriction for the predetermined time period.

4. The voice communication system according to claim 1, wherein the terminal device is configured to continue transmission of a voice signal until termination of the transmission, even when a voice signal having the transmission restriction information attached thereto is received from another terminal device during transmission of the voice signal.

5. A voice communication method of performing mutual communication between a plurality of terminal devices including a first terminal device as a caller and a second terminal device as a responder, via a server device connected via a network, the method comprising:
transmitting by the first terminal device according to a transmission operation by a user, a voice signal and identification information of the second terminal device, as a communication partner, to the server device,
transferring by the server device the voice signal transmitted from the first terminal device to the second terminal device,
continuously counting by the server device a number of simultaneous receptions of the voice signals,
transferring by the server device, in a case where the number of simultaneous receptions reaches a predetermined restriction value, the received voice signal with transmission restriction information attached thereto, to the second terminal device, and
performing by the second terminal device transmission restriction in which the second terminal device does not transmit a voice signal even when a transmission operation is performed by the user, during reception of a voice signal having the transmission restriction information attached thereto.

6. The voice communication method according to claim 5, wherein the terminal device is configured to perform full duplex communication in which even when the terminal device is transmitting a voice signal to the server device, the terminal device receives a voice signal transmitted from the server device, in parallel.

7. The voice communication method according to claim 6, wherein
the server device and the terminal device are each configured to divide the voice signal into predetermined time periods and perform sequential transmission thereof as voice packets,
the server device is configured to count the number of simultaneous receptions for each predetermined time period, and transmit, in a case where the number of simultaneous receptions reaches the predetermined restriction value, the voice packet with transmission restriction information attached thereto, and
the terminal device is configured to perform, in a case where the voice packet having the transmission restriction information attached thereto is received, transmission restriction for the predetermined time period.

8. The voice communication method according to claim 5, wherein the terminal device is configured to continue transmission of a voice signal until termination of the transmission, even when a voice signal having the transmission restriction information attached thereto is received from another terminal device during transmission of the voice signal.

9. The voice communication method according to claim 5, wherein in a case where the number of simultaneous receptions in the server device has reached the predetermined restriction value, the first terminal device and the second terminal device are configured to perform alternate communication in which after transmission of a voice signal by the first terminal device is terminated, the second terminal device is configured to start transmission of a voice signal, and after transmission of the voice signal by the second terminal device is terminated, the first terminal device is configured to start transmission of a voice signal.

10. A non-transitory computer-readable recording medium storing a voice communication program, the program causing a controller of a server device that communicates with a plurality of terminal devices including a first terminal device as a caller and a second terminal device as a responder, via a network, to execute instructions comprising:
- receiving a voice signal transmitted from the first terminal device;
- continuously counting a number of simultaneous receptions of the voice signals; and
- transferring a received voice signal to the second terminal device, the transferring including transferring, in a case where the number of simultaneous receptions reaches a predetermined restriction value, the received voice signal with transmission restriction information attached thereto, to the second terminal device.

11. The non-transitory computer-readable recording medium according to claim 10, wherein
- the receiving includes sequentially receiving voice packets including a voice signal divided into predetermined time periods, and
- the continuously counting includes counting the number of simultaneous receptions for each predetermined time period.

12. The voice communication system according to claim 2, wherein the terminal device is configured to continue transmission of a voice signal until termination of the transmission, even when a voice signal having the transmission restriction information attached thereto is received from another terminal device during transmission of the voice signal.

13. The voice communication system according to claim 3, wherein the terminal device is configured to continue transmission of a voice signal until termination of the transmission, even when a voice signal having the transmission restriction information attached thereto is received from another terminal device during transmission of the voice signal.

14. The voice communication method according to claim 6, wherein the terminal device is configured to continue transmission of a voice signal until termination of the transmission, even when a voice signal having the transmission restriction information attached thereto is received from another terminal device during transmission of the voice signal.

15. The voice communication method according to claim 7, wherein the terminal device is configured to continue transmission of a voice signal until termination of the transmission, even when a voice signal having the transmission restriction information attached thereto is received from another terminal device during transmission of the voice signal.

16. The voice communication method according to claim 6, wherein in a case where the number of simultaneous receptions in the server device has reached the predetermined restriction value, the first terminal device and the second terminal device are configured to perform alternate communication in which after transmission of a voice signal by the first terminal device is terminated, the second terminal device is configured to start transmission of a voice signal, and after transmission of the voice signal by the second terminal device is terminated, the first terminal device is configured to start transmission of a voice signal.

17. The voice communication method according to claim 7, wherein in a case where the number of simultaneous receptions in the server device has reached the predetermined restriction value, the first terminal device and the second terminal device are configured to perform alternate communication in which after transmission of a voice signal by the first terminal device is terminated, the second terminal device is configured to start transmission of a voice signal, and after transmission of the voice signal by the second terminal device is terminated, the first terminal device is configured to start transmission of a voice signal.

18. The voice communication method according to claim 8, wherein in a case where the number of simultaneous receptions in the server device has reached the predetermined restriction value, the first terminal device and the second terminal device are configured to perform alternate communication in which after transmission of a voice signal by the first terminal device is terminated, the second terminal device is configured to start transmission of a voice signal, and after transmission of the voice signal by the second terminal device is terminated, the first terminal device is configured to start transmission of a voice signal.

* * * * *